United States Patent
Pang et al.

(10) Patent No.: US 12,413,684 B2
(45) Date of Patent: Sep. 9, 2025

(54) BUFFERED VIDEO RECORDING

(71) Applicant: Snap Inc., Santa Monica, CA (US)

(72) Inventors: Chao Pang, Marina Del Rey, CA (US); Jianliang Hao, Beijing (CN); Haoyun Wu, Rancho Palos Verdes, CA (US); Xiangying Ma, Laguna Beach, CA (US)

(73) Assignee: Snap Inc., Santa Monica, CA (US)

( * ) Notice: Subject to any disclaimer, the term of this patent is extended or adjusted under 35 U.S.C. 154(b) by 113 days.

(21) Appl. No.: 18/516,655

(22) Filed: Nov. 21, 2023

(65) Prior Publication Data

US 2025/0080690 A1    Mar. 6, 2025

Related U.S. Application Data

(60) Provisional application No. 63/580,594, filed on Sep. 5, 2023.

(51) Int. Cl.
*H04N 5/77* (2006.01)
*H04N 5/91* (2006.01)

(52) U.S. Cl.
CPC ............... *H04N 5/77* (2013.01); *H04N 5/91* (2013.01)

(58) Field of Classification Search
CPC ............ H04N 5/77; H04N 5/91; H04N 5/772
See application file for complete search history.

(56) References Cited

U.S. PATENT DOCUMENTS

| 8,965,898 B2 * | 2/2015 | Aman ..................... G01S 17/66 707/913 |
| 2016/0309084 A1 * | 10/2016 | Venkataraman ..... H04N 25/531 |

* cited by examiner

*Primary Examiner* — Usman A Khan
(74) *Attorney, Agent, or Firm* — Schwegman Lundberg & Woessner, P.A.

(57) ABSTRACT

A system is provided that detects a start of a camera session, captures initial raw data frames and stores them in memory. Upon determining that the camera session corresponds to a video recording session, the system activates a video recording pipeline and upon determining that the video recording pipeline is active, the system retrieves the initial raw data frames, encodes the initial raw data frames using the video recording pipeline, accesses additional captured raw data frames, and encodes the additional captured raw data frames using the video recording pipeline until detection of an end of the camera session. Upon detecting an end of the camera session, the system deactivates the video recording pipeline.

20 Claims, 11 Drawing Sheets

BUFFERED VIDEO RECORDING

CROSS-REFERENCE TO RELATED APPLICATIONS

This application claims the benefit of the filing date of U.S. Provisional Application Ser. No. 63/580,594, filed on Sep. 5, 2023, the disclosure of which is hereby incorporated by reference in its entirety.

TECHNICAL FIELD

The disclosed subject matter relates generally to the technical field of video capture or video recording and, in one specific example, to a system for buffered video recording.

BACKGROUND

Real-time capture of images, audio or video is an important feature which allows users to make rapid content capture decisions while using, for example, mobile devices or social media applications. Furthermore, users expect that the content captured will not be lost or dropped, and that their experience will not be negatively impacted by a truncated video or missing audio.

BRIEF DESCRIPTION OF THE SEVERAL VIEWS OF THE DRAWINGS

In the drawings, which are not necessarily drawn to scale, numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
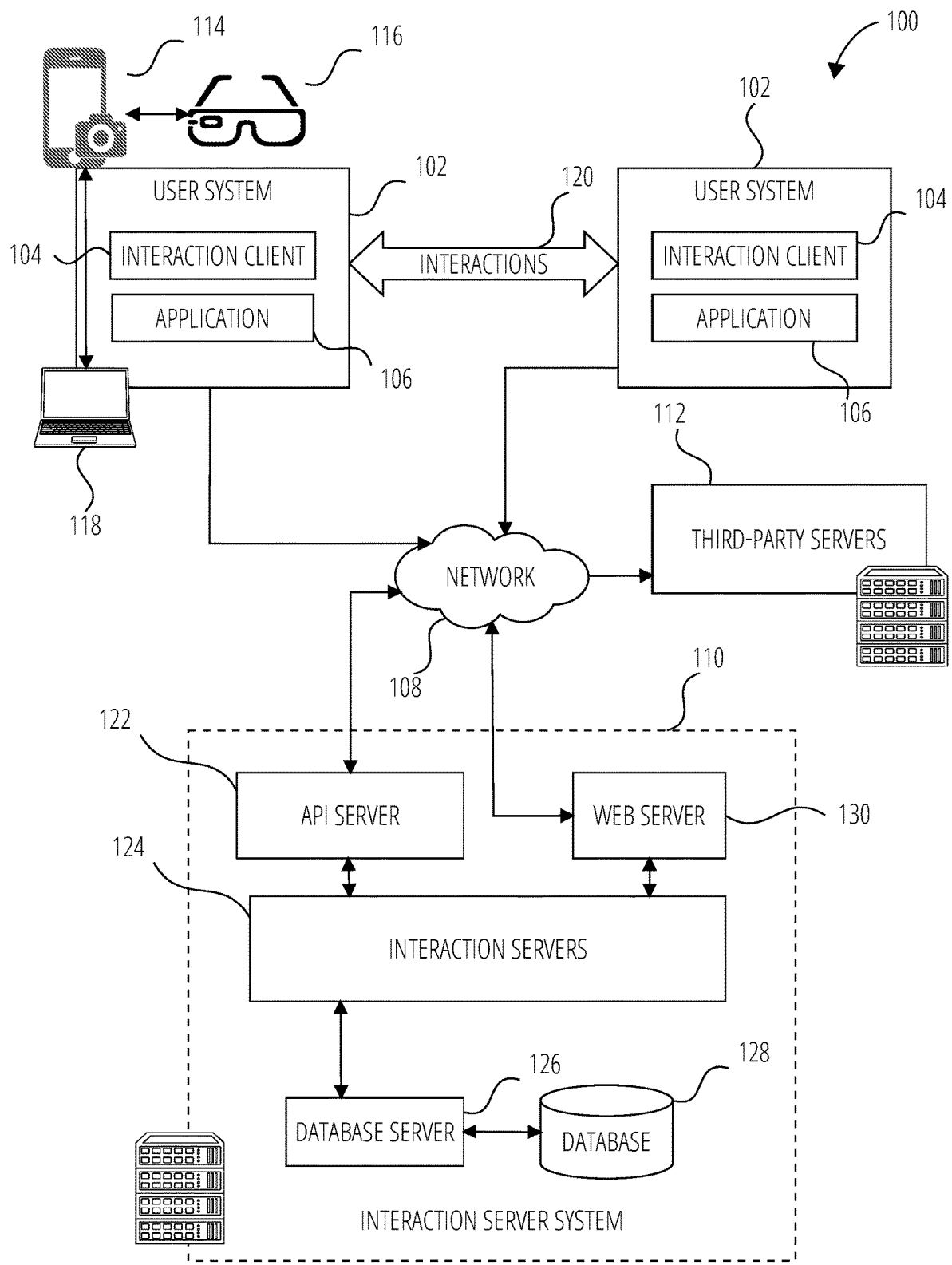
FIG. 1 is a diagrammatic representation of a networked environment in which the present disclosure may be deployed, according to some examples.

As mentioned above, real-time capture of content such as images, audio or video is an important feature which enables users to make spontaneous decisions about content capture, especially in the context of mobile devices or social networking applications. Existing systems can experience delays between a start of a camera session, such as for example a video recording session, and fully activating an internal video recording pipeline. For instance, a system where an action, such as pressing a button, can start either a photo capture session or a video recording session will require a period of time to determine the intended camera session type. This period of time causes initial frames to be omitted from a captured video and affects the user experience, as the recorded video would lack its beginning content. Furthermore, delays or processing issues can also occur later in the normal course of activity for a video recording pipeline, and can result in later captured frames not being timely processed, or being dropped due to the system having insufficient temporary storage to accommodate them.

Example embodiments described herein refer to a buffered video recording (BVR) system which addresses the above-mentioned and other technical issues, and therefore records video on demand and without content loss. In some examples, upon detecting activation of a camera trigger, such as a button press by a user, the camera service module starts a camera session, which includes capturing raw data frames, such as video and/or audio frames. In some examples, the camera service module interacts with components such as the video recording pipeline using the "announcer/listener" model. For example, if the BVR system determines that the camera session is a video recording session, the announcer (the camera service) dispatches captured raw data frames (such as video frames) to be consumed by the listener (the video recording pipeline). An operational video recording pipeline retains the raw data frames for processing, where processing involves compressing or encoding the raw data frames. The raw data frames may be retained or buffered in memory storage, such as a storage of the camera service module, described in further detail below. The video recording pipeline can send the processed frames to other downstream system components for further consumption. For example, processed video frames can be sent to a preview component for video playback. Once frames have been processed by the appropriate system components, the video recording system can delete them from memory to free up memory resources.

To minimize user friction, a BVR system uses the same type of camera trigger, such as a button press on a touch screen, to start a photo capture session or a video recording session. In some examples, a BVR system automatically determines whether the camera trigger type corresponds to a photo capture session or a video recording session. For instance, the BVR system initializes the video recording pipeline only after determining that the camera session type corresponds to a video recording session, thereby conserving resources that would have been wasted if the camera session type instead corresponded to a photo capture session. To determine the camera session type, the BVR system uses one or more signals, such as the amount of time a camera trigger remains activated, the type of an application started by a user, the type of device in use, and so forth.

In the case where the same camera trigger type is used to activate a photo capture session or a video recording session, there is a delay between the start of the camera session, determining that a video recording session should be activated, and fully activating the video recording pipeline. Because of this delay, video and audio frames are lost in the event that a video recording is desired. To address these technical issues, the BVR system captures and stores initial raw data frames, such as video and/or audio frames, until the video recording pipeline has been activated. Thus, initial video and/or audio frames are not lost before they can be processed by the video recording pipeline. Similar techniques are applied, in some examples, to additional raw data frames captured later, to minimize other types of delays in frame processing.

In some examples, the BVR system buffers the initial raw data frames, using an internal frame buffer pool associated with or included in a camera service module, by assigning them sequential reference numbers, or increasing a reference count. Increasing the reference count has the effect of increasing the valid lifetime of frames, which will be kept in a buffer until released once the video recording pipeline has finished processing them.

If memory storage is limited, a significant delay in the setup and/or activation of a video recording module could lead to storage being filled up with not-yet-processed frames, while newly captured frames are arriving. This could cause the BVR system to start dropping frames, resulting in an undesirable "sticky video" situation, in which frames captured by the camera service module, are not made part of the recorded video. To alleviate this issue, the video recording pipeline of the BVR system copies raw data frames received from the camera service module and stores them in local memory. Local memory storage of the raw data frames by a listener component like the video recording pipeline ensures that captured raw data frames are stored for later processing, while freeing up space faster in the memory storage used by the camera service module.

Overall, the BVR system initiates video recording operations while minimizing time and resource waste, minimizes lost or dropped captured data frames, and thus, ensures the quality of a recorded video file.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 710); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
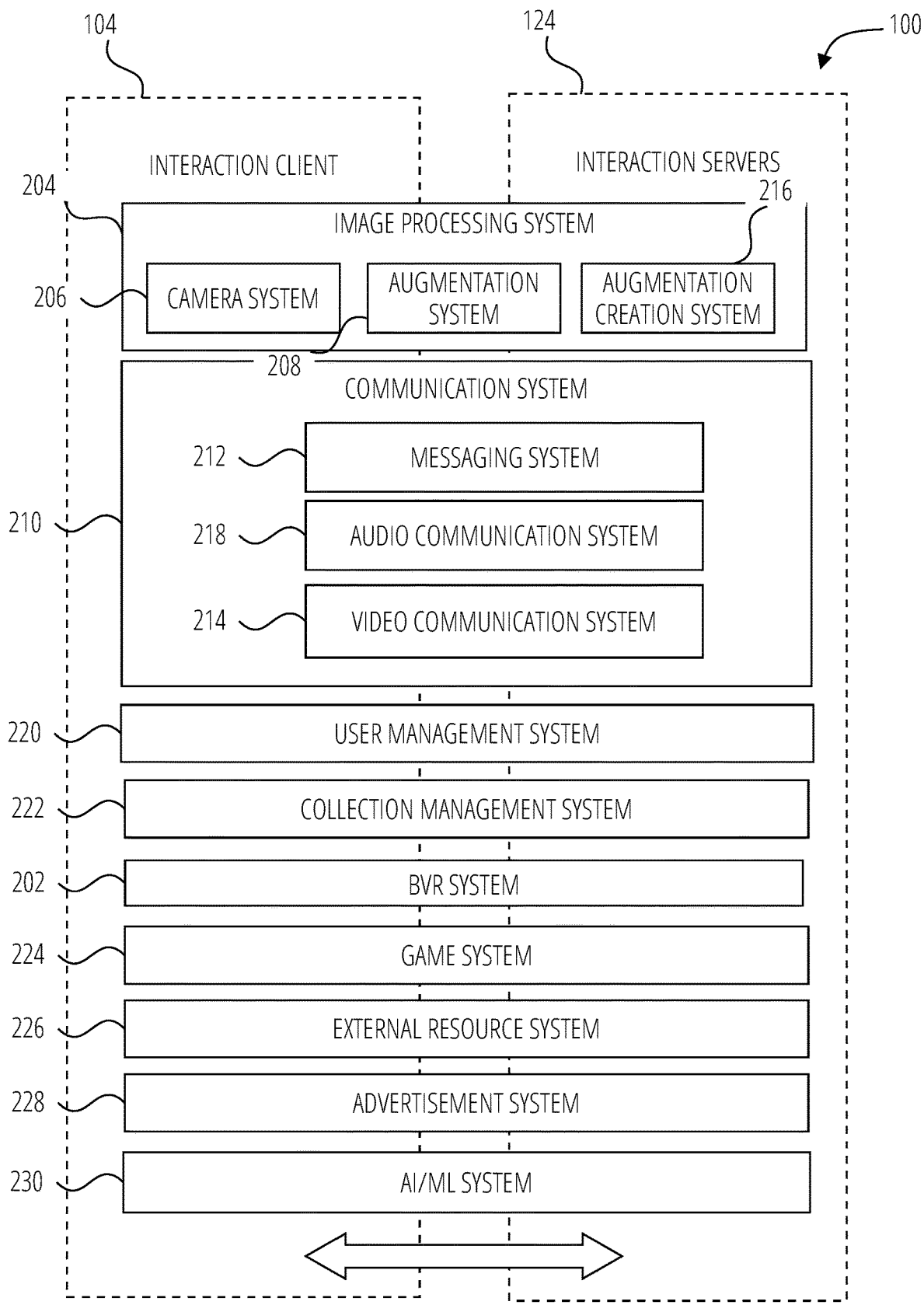
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture.

A BVR system 202 provides various functions that enable a user to record video without undue delays or dropped or lost frames. The BVR system 202 may use some of the functions or output of the camera system 206, or the video communication system 214. In some examples, the BVR system 202 may be a component of the camera system 206.

An image processing system 204 provides various functions that enable a user to capture and augment (e.g., annotate or otherwise modify or edit) media content associated with a message.

A camera system 206 includes control software (e.g., in a camera application) that interacts with and controls hardware camera hardware (e.g., directly or via operating system controls) of the user system 102 to modify and augment real-time images captured and displayed via the interaction client 104.

The augmentation system 208 provides functions related to the generation and publishing of augmentations (e.g., media overlays) for images captured in real-time by cameras of the user system 102 or retrieved from memory 1006 of the user system 102. For example, the augmentation system 208 operatively selects, presents, and displays media overlays (e.g., an image filter or an image lens) to the interaction client 104 for the augmentation of real-time images received via the camera system 206 or stored images retrieved from memory of a user system 102. These augmentations are selected by the augmentation system 208 and presented to a user of an interaction client 104, based on a number of inputs and data, such as for example:

Geolocation of the user system 102; and
Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 204 may interact with, and support, the various subsystems of the communication system 210, such as the messaging system 212 and the video communication system 214.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 204 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 204 provides a user-based publication platform that enables users to select a geolocation on a map and upload content associated with the selected geolocation. The user may also specify circumstances under which a particular media overlay should be offered to other users. The image processing system 204 generates a media overlay that includes the uploaded content and associates the uploaded content with the selected geolocation.

The augmentation creation system 216 supports augmented reality developer platforms and includes an application for content creators (e.g., artists and developers) to create and publish augmentations (e.g., augmented reality experiences) of the interaction client 104. The augmentation creation system 216 provides a library of built-in features and tools to content creators including, for example custom shaders, tracking technology, and templates.

In some examples, the augmentation creation system 216 provides a merchant-based publication platform that enables merchants to select a particular augmentation associated with a geolocation via a bidding process. For example, the augmentation creation system 216 associates a media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 218, and a video communication system 214. The messaging system 212 is responsible for enforcing the temporary or time-limited access to content by the interaction clients 104. The messaging system 212 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 218 enables and supports audio communications (e.g., real-time audio chat) between multiple interaction clients 104. Similarly, the video communication system 214 enables and supports video communications (e.g., real-time video chat) between multiple interaction clients 104.

A user management system 220 is operationally responsible for the management of user data and profiles, and maintains entity information (e.g., stored in entity tables 708, entity graphs 710 and profile data 702) regarding users and relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system (not shown) provides various geographic location (e.g., geolocation) functions and supports the presentation of map-based media content and messages by the interaction client 104. For example, an example map system enables the display of user icons or avatars (e.g., stored in profile data 802) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 204 and the camera system 206 to analyze images and extract information such as objects, text, or faces. This information can then be used by the image processing system 204 to enhance, filter, or manipulate images. The artificial intelligence and machine learning system 230 may be used by the augmentation system 208 to generate augmented content and augmented reality experiences, such as adding virtual objects or animations to real-world images. The communication system 210 and messaging system 212 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 218 to provide speech recognition and natural language processing capabilities, allowing users to interact with the interaction system 100 using voice commands.

Buffered Video Recording (BVR) System

Figure 3:
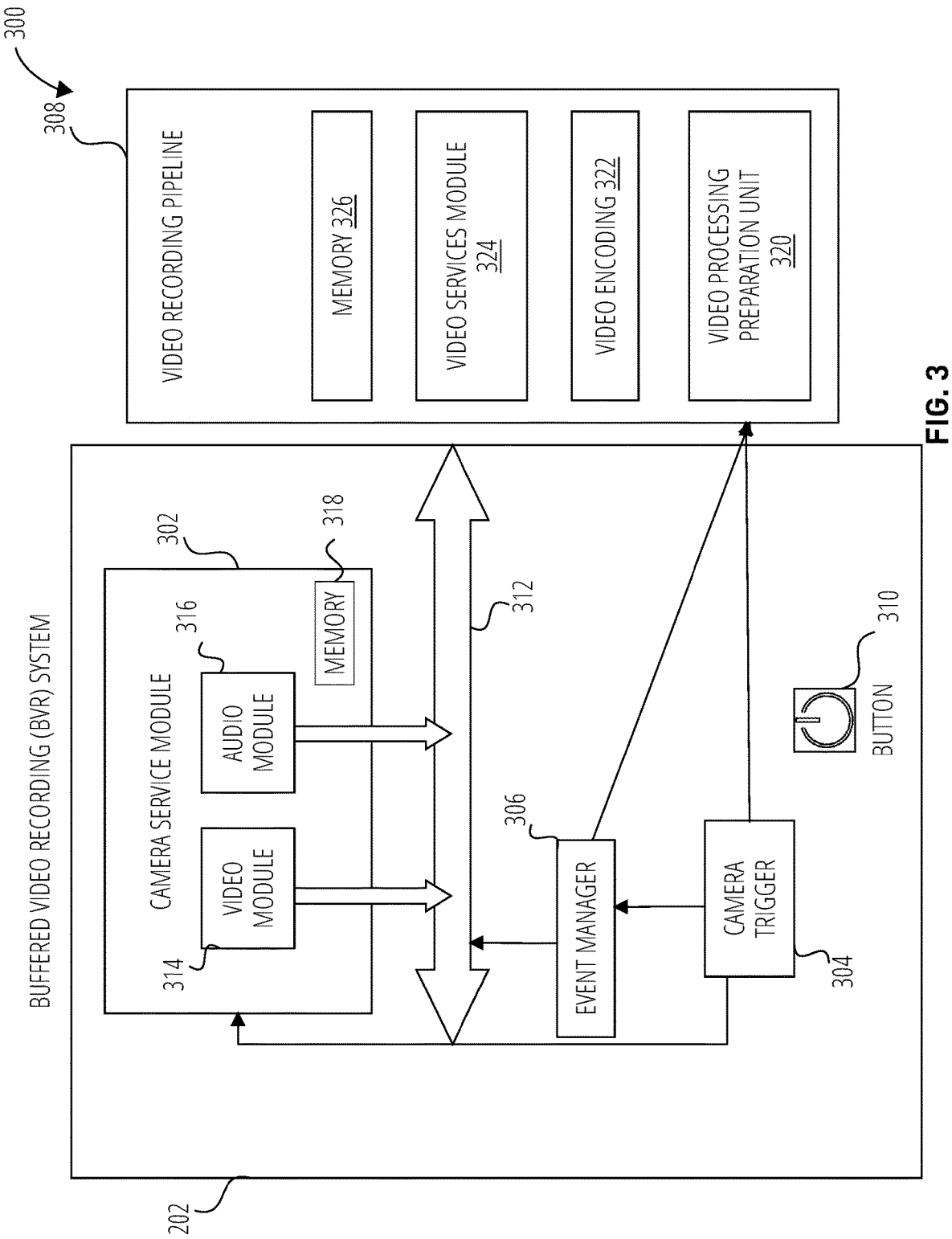
FIG. 3 is a diagrammatic representation of a buffered video recording system, according to some examples.

FIG. 3 illustrates a Buffered Video Recording (BVR) system 202 for recording videos without delays and frame loss, according to some examples. The BVR system 202 includes a camera service module 302, a communication bus 312, a video recording pipeline 308, a camera trigger 304 and an event manager 306.

The example camera service module 302 includes a video module 314, an audio module 316, and a memory 318. The event manager 306 detects the activation of a camera trigger 304. In some examples, activating a camera trigger 304 is represented by pressing a button 310, such as a mechanical button or a representation of a button on a touch screen display. In some examples, activating a camera trigger 304 is represented by an activation of a camera application. Upon detecting the activation of a camera trigger 304, the event manager 306 instructs the camera service module 302 to start a camera session, which includes capturing raw data frames, including video frames such as YUV frames, audio frames such as PCM frames, and so forth.

In some examples, the camera service module 302 is communicatively coupled, via a communication bus 312, to a video recording pipeline 308 which includes a video processing preparation unit 320, a video encoding module 322, and a video services module 324. The video services module 324 can be a part of the video recording pipeline 308, external to the video recording pipeline 308, or share functions with the video recording pipeline 308.

After activation of a camera trigger 304 the event manager 306 automatically determines whether activating the camera trigger 304 corresponds to a video capture session or a photo capture session. Upon determining that the activating the camera trigger 304 corresponds to a video capture session, the event manager 306 instructs the video recording pipeline 308 to start preparing for operations, via the video processing preparation unit 320. Preparing for operations includes initializing a video encoding module 322, configuring an audio session, and so forth.

To determine if the activation of camera trigger 304 initiates a video recording session, the BVR system 202 takes into account how long the camera trigger 304 has been activated, such as whether a length of a button press exceeds a predetermined threshold. Other example characteristics taken into account by the BVR system 202 to detect a video recording session include the time of day, the location of the user, the type and capabilities of the computing device, explicit or inferred user intent based on signals such as the user opening an application that uses or implements video recording, patterns of use for the user and the device (for example, percentage of time or percentage of sessions during which user takes photos rather than records videos), and so forth. In some examples, the BVR system 202 uses signals such as those above to determine that a video recording request is unlikely. For example, from tracking use of a particular application, the BVR system may determine that the user is taking more photos than videos and use this information as an indicator that a new camera trigger is more likely to correspond to a photo capture event rather a video capture session.

In some examples, once the video recording pipeline 308 is activated, the video recording pipeline 308 starts consuming raw data frames dispatched by the camera service module 302. In some examples, video module 314 and/or audio module 316 of the camera service module 302 continuously capture frames and dispatch them through the connector bus 312. In some examples, the time between the start of a camera session and the complete activation of the video recording pipeline 308 may be a few hundred milliseconds (e.g., 467 ms for iOS and 685 ms for Android), during which the camera service captured initial raw data frames so that no initial frames of a video stream are lost during the determination of the video session and initialization of the video recording pipeline 308

The BVR system 202 stores and/or buffers the initially captured raw data frames for subsequent processing by a fully operational video recording pipeline 308. The video recording pipeline 308 starts processing or encoding the stored or buffered raw data frames before transitioning to processing or encoding any additional raw data frames dispatched by the camera service module 302 after the video recording pipeline has become operational. In some examples, the camera service module 302, or the video recording pipeline 308, stores or buffers the raw data frames for processing by assigning sequential reference numbers to each frame or increasing the frame count as each frame is captured and stored, as discussed in further detail below with respect to at least FIG. 4 and FIG. 7. In some examples, the BVR system 202 buffers the initially captured raw data frames prior to the video recording pipeline 308 becoming fully activated. In some examples, the BVR system 202 buffers additional raw data frames, captured and dispatched after the video recording pipeline 308 becomes fully activated. In some examples, the BVR system 202 uses for buffering a memory 318 component of the camera service module 302, and/or an internal frame buffer pool preconfigured according to operating system requirements. In some examples, the video recording pipeline 308 copies the initially captured raw data frames and video frames captured after the recording pipeline becomes operational, and stores them in memory 326.

Once the video recording pipeline 308 is active, the video encoding module 322 processes or encodes available raw data frames. In some examples, encoded data frames are consumed by components of a video services module 324 of a BVR system 202, such as a preview module for playback purposes, an identification module for identification of images in photo or video files, and other downstream system components. The video services module 324 uses, according to some examples, a memory unit for temporary and/or permanent storage of information needed for the operation of services. In some examples, the used memory unit is memory 326. In some examples, the used memory unit is internal to the video services module 324. After raw data frames are encoded and consumed by all other appropriate components, they can be deleted from local memory storage (such as an internal frame buffer pool), freeing up memory resources.

In some examples, the BVR system 202 starts preparing the video recording pipeline 308 for operations upon detecting the start of a camera session, without an additional delay. In some examples, the BVR system 202 starts preparing at least some components of the video recording pipeline 308 for operations even before a camera session was determined to have started, for example, based on signals such as potential user intent, device type, and so forth. In some examples, the event manager 306 determines that the video recording pipeline 308 is still active after a recent video camera session; if so, buffering captured frames may not be necessary, as the video recording pipeline 308 is already operational and can directly process dispatched captured frames. In some examples, after a first video is recorded, the BVR system 202 maintains the video recording pipeline 308 in an active state, in a stand-by state, in a sleep state, or other state in preparation for a potential subsequent video recording. When not in use, the components of the video recording pipeline 308 are shut down or put in sleep mode in order to conserve resources.

In some examples, raw data frames (whether initially captured raw data frames or raw data frames captured later) are separated into video and audio frames by the camera service module 302, and/or by the video recording pipeline 308, and/or by another component of the video recording pipeline 308. In some examples, the video recording pipeline 308 compresses the raw audio and video data, recombines the compressed data, and outputs the data in a format for use by one or more of the various video services, or a format to be used for accurate playback. In some examples, corresponding sequential reference numbers assigned to the video and audio frames allow multiplexing of the encoded, or compressed, video frames with audio frames to generate a video recording file for further consumption by video services. The video recording pipeline 308 can also include additional processing capabilities as required by video services or additional type video services.

In some examples, data frames such as raw data frames or encoded data frames are buffered or stored at a variety of locations within a BVR system 202, such as within the memory 318 component of the camera service module 302, the memory 326 component of the video recording pipeline 308, and so forth. In some examples, memory components such as memory 318 includes buffers, look up tables, and other memory storage devices or functions. In some examples, memory components such as memory 318 have a corresponding internal buffer pool capacity. In some examples, memory components such as memory 318 are components or sub-modules of a BVR system 202, but are implemented based on operating system requirements, and therefore have a fixed internal buffer pool capacity instead of a configurable buffer pool capacity. In some examples, each frame is retained in a buffer (e.g., in the internal buffer pool for memory 318) for a period of time corresponding to a valid lifetime of the frame. The valid lifetime of a frame depends, in some examples, on the recording delay time, which may include preparation time such as the preparation time of a video recording module or pipeline. In some examples, a frame is processed by one or more components (for example, a listener component such as a video recording pipeline 308), with different components having different processing times. The valid lifetime of a frame depends, in some examples, on the processing time(s) required by such component(s). The frame can remain in memory for as long one or more components need. In one example, the frame is deleted once no component causes it to be retained any longer.

In some examples, the BVR system 202 evaluates the performance, quality or reliability of video recording including multiple metrics, including Camera Creation Delay (CCD) for video recording and sticky video rate. Video CCD measures user experience in video capture performance from a first press of a button 310 or other element to a first frame being rendered in a preview display. Sticky video rate refers to severity of frame dropping in a recorded video, where dropped frames are frames captured by the camera service module that are not made part of the recorded video.

Figure 4:
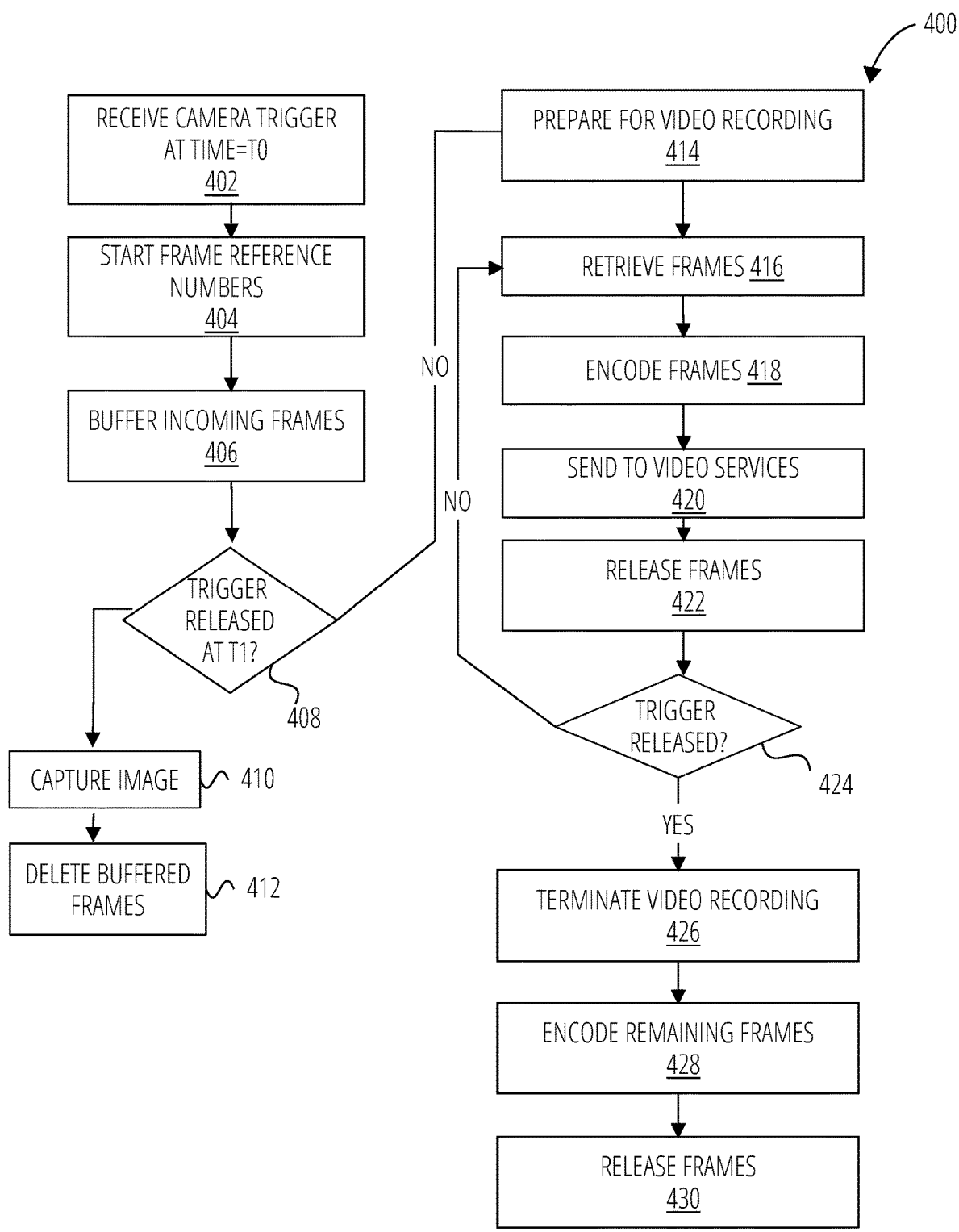
FIG. 4 is a flow diagram of a buffered video recording method, according to some examples.

FIG. 4 is a flow diagram of a method 400 for buffered video recording, as performed by the BVR system 202, according to some examples. At operation 402, the event manager 306 detects an activation of a camera trigger by a user at a time T0. The camera trigger activation corresponds to a start of a camera session. At operation 404, the BVR system 202 starts applying frame reference numbers to frames as they are captured by the camera service module 302. The reference numbers can start from 0 or from a different number. At operation 406, the BVR system 202 stores or buffers, in a buffer, the captured frames (e.g., raw data frames such as video frames) using consecutive reference numbers. In some examples, the BVR system 202 buffers the data frames using a buffer that is part of the memory 318 component of the camera service module 302.

In some examples, the BVR system 202 monitors the status of the camera trigger in order to determine if the user intends to record video rather than capture a photo. At operation 408, the BVR system 202 checks, at a predetermined time T1, whether the camera trigger is released. If so, the BVR system 202 determines that the user intends to capture a photo. The BVR system 202 captures the current image and/or frame at operation 410 and stops processing video frames. At operation 412, the BVR system 202 deletes or releases the buffered frames, emptying the corresponding buffer and/or freeing pool or buffer capacity.

If at time T1 the BVR system 202 determines that the camera trigger is still activated, the BVR system 202 determines that the user intends to capture a video recording and the BVR system initiates corresponding preparations for the video recording at operation 414. The BVR system 202 retrieves, at operation 416, the available raw data frames. The BVR system 202 first retrieves buffered raw data frames corresponding to the initial raw data frames captured during a delay before the video recording pipeline becomes operational, and continues with any additional raw data frames captured and dispatched by the camera service module after activation of the video recording pipeline and until the camera trigger is released (determined at operation 424), indicating the end of video capture. While the video capture is ongoing, the BVR system 202 processes available raw data frames, at operation 418, for example by encoding the available raw data frames using the video encoding module

322. At operation 420, the BVR system 202 sends the processed or encoded video frames to other components for consumption. For example, the BVR system 202 sends the processed or encoded video frames to the video services module 324. At operation 422, the BVR system 202 releases the processed or encoded data frames to free up pool or buffer capacity.

If the BVR system 202 determines at operation 424 that the trigger is released, video recording is terminated at operation 426. The BVR system 202 will process (e.g., encode) any remaining raw data frames (at operation 428) and release them at operation 430.

In some examples, once a camera session starts at time T0, the BVR system 202 starts copying raw data frames (captured and dispatched by the camera service module 302) and storing them, for example in memory, using a buffer or any other memory storage device. In some examples, the BVR system 202 copies over both initially captured raw data frames (before a determination is made that the user is interested in video recording), and raw data frames captured later, until an end to a video recording session is detected as described above. In some examples, the BVR system 202 uses the memory 326 of the video recording pipeline 308 to store copied raw data frames. By copying over captured raw data frames, the BVR system 202 allows for their later processing by the fully activated video recording pipeline, while ensuring that key shared memory resources, such as those of the camera service module 302 are not monopolized by just one listener component (such as the video recording pipeline 308). For example, if the video recording pipeline 308 encounters a delay while being fully activated or a later delay during the encoding process, such delays will impact only its local storage and not memory resources of the camera service module 302.

Figure 5:
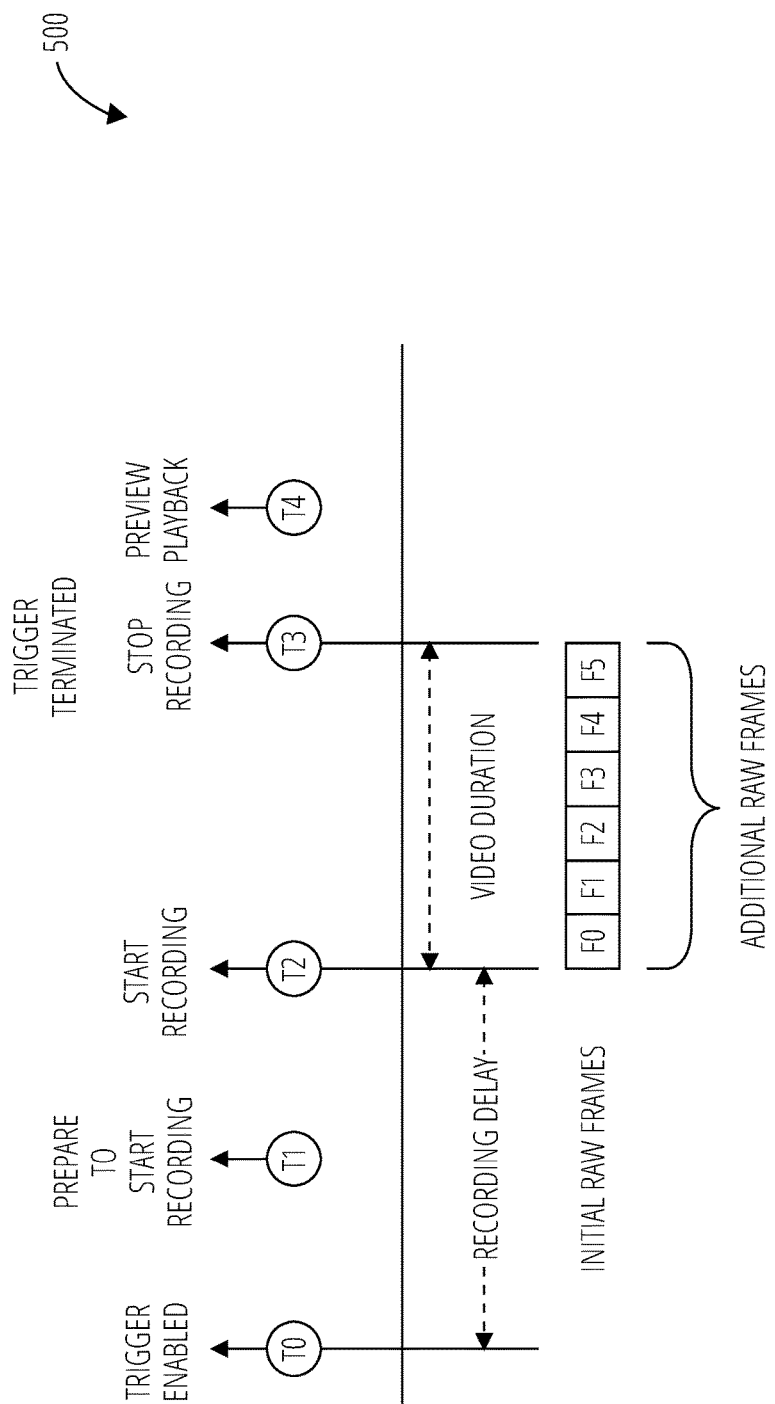
FIG. 5 is a timing diagram for a buffered video recording method, according to some examples.

FIG. 5 is a partial timing diagram 500 of a buffered video recording method, as implemented by a BVR system 202, according to some examples. FIG. 5 illustrates operations corresponding to different times starting with the detected start of a camera session and ending with the detected termination of a camera session.

At time T0, the BVR system 202 detects the initiation of a camera session by enabling a trigger, such as a user engaging an activation button on a touch screen display. At time T1, the BVR system 202, for example via the event manager 306, determines that the initiated camera session is a video recording session and initiates recording preparations, for example via the video processing preparation unit 320. In some examples, the BVR system 202 completes preparations for video recording, in the time period T1 to T2, for example via the video processing preparation unit 320 which sets up various components for processing data frames of video streams. At time T2, the preparations for video recording are complete, and the video recording pipeline 308 is prepared and ready consume raw data frames such as video and audio frames. The BVR system 202, via the video recording pipeline 308, starts recording (e.g., processing or encoding) video streams from time T2 until time T3, when the BVR system 202 detects that the trigger is deactivated. The processing of the video stream includes assigning reference numbers to newly captured, incoming data frames shown as F0 to F5. During the T3-T4 time period, the video recording pipeline concludes the encoding of raw data frames and passes the encoded frames to a preview component for playback.

As explained above, while the video recording pipeline 308 starts processing newly captured frames at T2, initial raw data frames may have been captured by the camera service module 302 before the video recording pipeline 308 became ready to process them. In some examples, the frames captured in the T0-T2 period are saved (stored or retained) for later processing (e.g., by the video encoding module 322).

In some examples, captured raw data frames include both video and audio frames, each frame type processed in a separate stream, with the streams to be re-combined prior to recording and playback. The BVR system 202, using video encoding 322 within a video recording pipeline 308, processes the frames by encoding raw frames, generating encoded frames, and sending the encoded frames to other components for further consumption.

Figure 6:
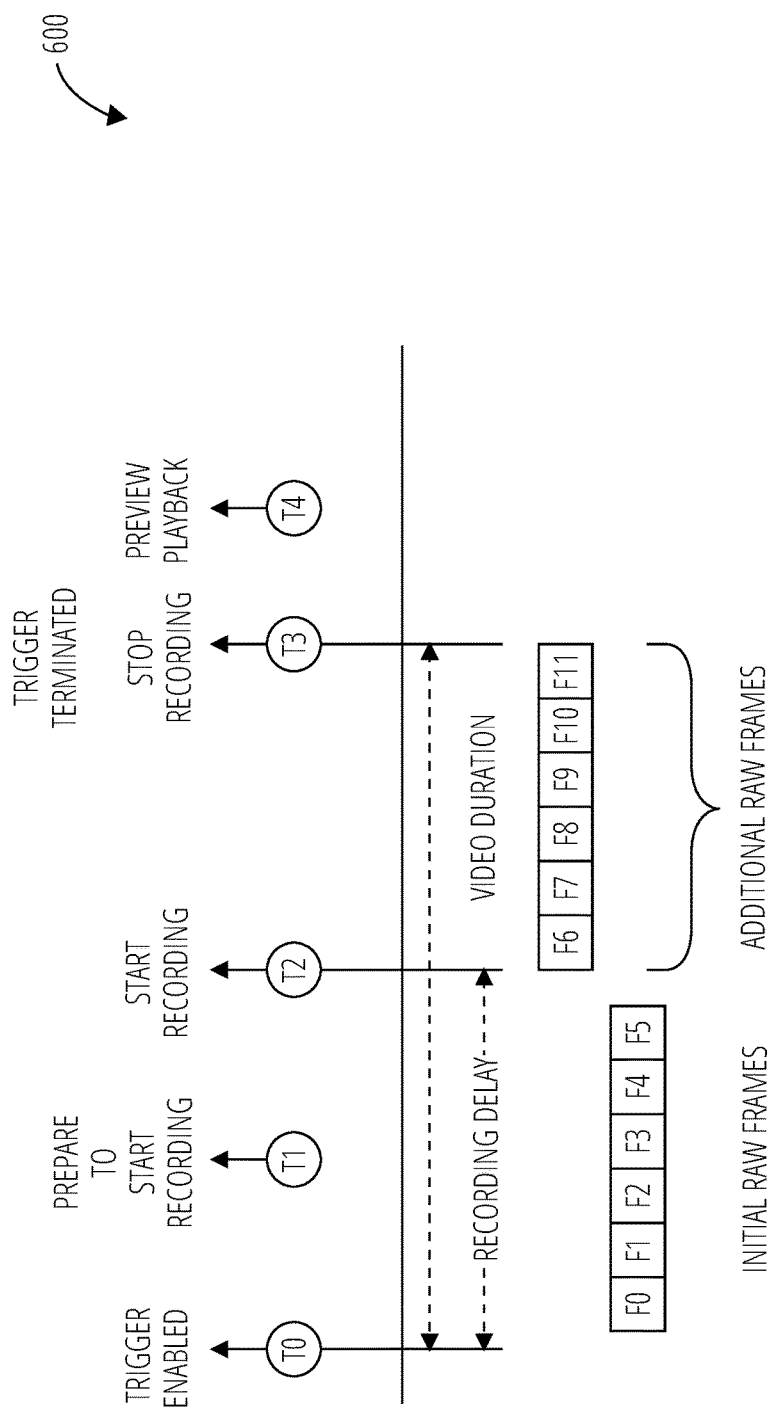
FIG. 6 is a timing diagram of a buffered video recording method, according to some examples.

FIG. 6 is a partial timing diagram 600 of a buffered video recording method, as implemented by a BVR system 202, according to some examples.

The BVR system 202 detects, at time T0, the enabling of a trigger corresponding to the start of a camera session. As in FIG. 5, a number of initial raw data frames (video frames, audio frames) may be captured in the period T0-T2, corresponding to the time between the detection of camera session start and the end of preparations for video recording.

In some examples, the BVR system 202 buffers captured raw data frames and assigns sequential reference numbers to each captured frame stored in a memory 318 module of the camera service module 302. FIG. 6 illustrates the assignment of sequential reference numbers to raw data frames starting with the raw data frames captured in the T0-T2 period, which covers period T0-T1 (between the detection of the camera trigger activation and the determination of an intent to perform a video recording) and period T1-T2 (between the determination of an intent to perform a video recording and the end of the video recording preparations). In the FIG. 6 example, raw data frames F0 through F5 are captured during the period T0-T2, while raw data frames F6 through F11 correspond to later raw data frames, captured at or after T2 (when the video recording pipeline 308 is ready to process frames). By buffering raw data frames through assigning them increasing reference numbers, the BVR system 202 is extending the valid lifetime of raw data frames captured (e.g., generated) by the camera service module 302 and ensuring that they are available for later processing by a fully operational video recording pipeline 308.

In some examples, the assignment of the reference number or reference count to the frames is done by the video recording pipeline 308 (for example, by the video encoding module 322). At time T2, an operational video recording pipeline 308 receives a set of initial raw data frames (captured before T2) and a newly captured raw data frame. The video recording pipeline 308 sequentially numbers the initial raw data frames (e.g., starting at F0). The video recording pipeline 308 assigns a reference count to the first raw data frame captured at or after T2 which is equal to the number of initial, buffered data frames (for example, F6 in the FIG. 6 example). The video recording pipeline 308 continues assigning sequential reference counts F7-F11 to incoming, captured raw data frames. In some examples, the BVR system 202 coordinates reference counts for frames using the camera service module 302 and the video recording pipeline 308. For example, the video recording pipeline 308 receives already numbered frames F0-F5, and/or a reference count for at least the first frame captured at or after T2 (e.g., F6).

Components of the video recording pipeline 308, such as the video encoding module 322 component, can encounter delays preventing them from processing a current frame, while new frames are being captured and potentially dropped due to the memory storage of the camera service module 302 being filled with unreleased, unprocessed frames. Additionally, the memory storage of the camera service module 302 can be limited, or multiple services may act as listeners for the camera service module 302, placing further demands on its memory storage and potentially leading to dropped frames. Dropped frames can lead to the video becoming "sticky," which would adversely impact the user experience.

To mitigate the above problems, in some examples the BVR system 202 makes copies of the initial raw data frames captured started at time T0, as explained above. Copies are stored, in some examples, in memory 326 of the video recording pipeline 308. Once the video recording pipeline 308, including the video encoding module 322, becomes fully operation at T2, the video recording pipeline 308 retrieves and processes all copied frames. The video recording pipeline 308 then processes newly captured raw data frames received from the camera service module 302, according to some examples. In some examples, BVR system 202 also makes copies of newly captured raw data frames, storing them for instance in memory 326 of the video recording pipeline 308. In some examples, to mitigate any additional memory usage due to copying the frames to local memory, the BVR system 202 only retains the most recent N frames, where N=2, N=3, and so forth. In some examples, the optimal value for N can be found through A/B testing. In some examples, the extra latency in copying the frames is minimal (for example, ~0.5 ms on iPhone 7 per frame).

There are a variety of other methods that may be implemented for retaining or buffering the initial video frames, or a portion of the frames, during the recording delay time period.

Data Architecture

Figure 7:
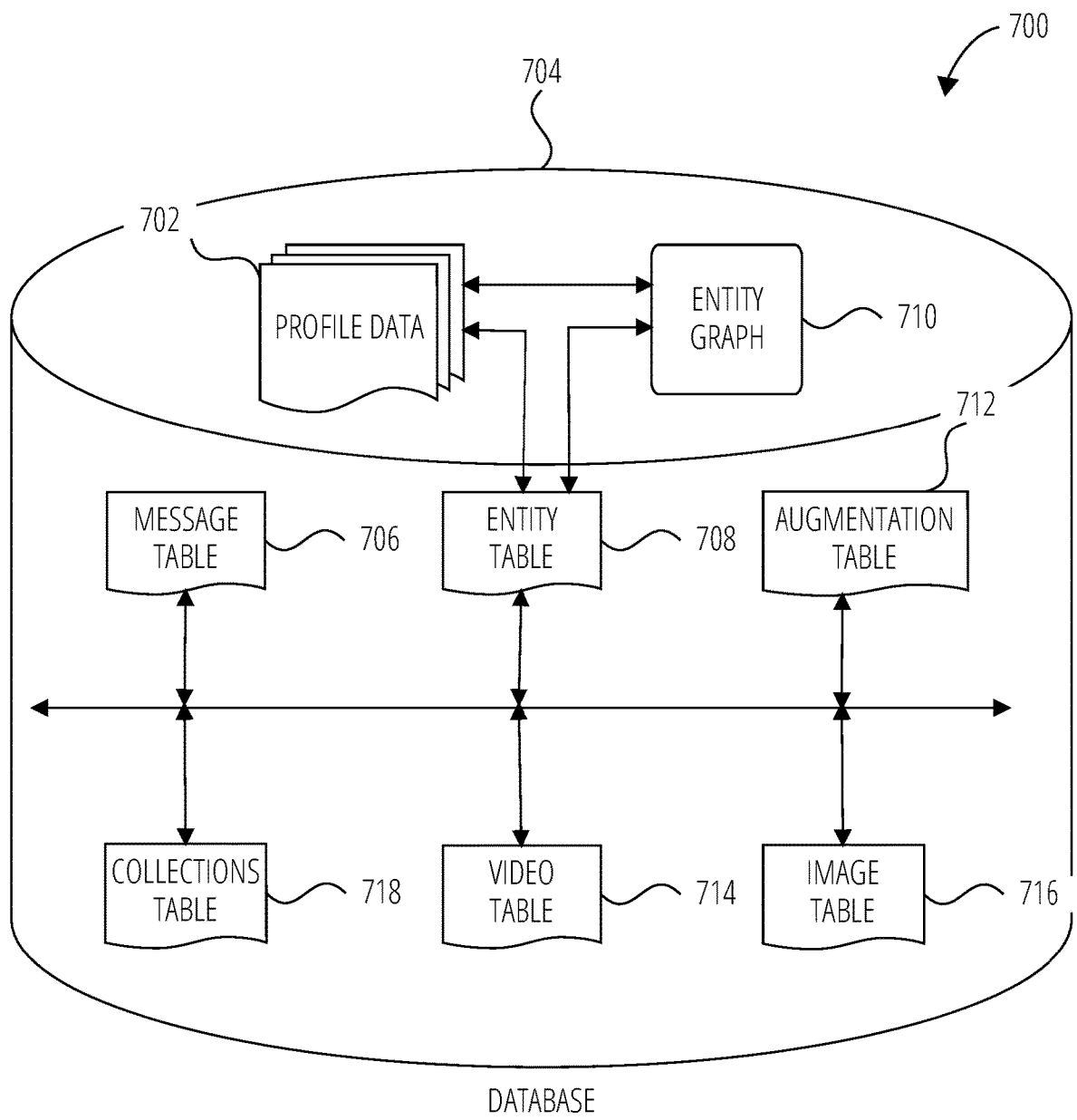
FIG. 7 is a diagrammatic representation of a data structure as maintained in a database, according to some examples.

FIG. 7 is a schematic diagram illustrating data structures 700, which may be stored in the database 704 of the interaction server system 110, according to certain examples. While the content of the database 704 is shown to comprise multiple tables, it will be appreciated that the data could be stored in other types of data structures (e.g., as an object-oriented database).

The database 704 includes message data stored within a message table 706. This message data includes, for any particular message, at least message sender data, message recipient (or receiver) data, and a payload. Further details regarding information that may be included in a message, and included within the message data stored in the message table 706, are described below with reference to FIG. 7.

An entity table 708 stores entity data, and is linked (e.g., referentially) to an entity graph 710 and profile data 702. Entities for which records are maintained within the entity table 708 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 710 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 708. Such privacy settings may be applied to all types of relationships within the context of the interaction system 100, or may selectively be applied to certain types of relationships.

The profile data 702 stores multiple types of profile data about a particular entity. The profile data 702 may be selectively used and presented to other users of the interaction system 100 based on privacy settings specified by a particular entity. Where the entity is an individual, the profile data 702 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 702 for the group may similarly include one or more avatar representations associated with the group, in addition to the group name, members, and various settings (e.g., notifications) for the relevant group.

The database 704 also stores augmentation data, such as overlays or filters, in an augmentation table 712. The augmentation data is associated with and applied to videos (for which data is stored in a video table 714) and images (for which data is stored in an image table 716).

Filters, in some examples, are overlays that are displayed as overlaid on an image or video during presentation to a recipient user. Filters may be of several types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process.

Examples of data filters include current temperature at a specific location, a current speed at which a sending user is traveling, battery life for a user system 102, or the current time.

Other augmentation data that may be stored within the image table 716 includes augmented reality content items (e.g., corresponding to applying "lenses" or augmented reality experiences). An augmented reality content item may be a real-time special effect and sound that may be added to an image or a video.

A collections table 718 stores data regarding collections of messages and associated image, video, or audio data, which are compiled into a collection (e.g., a story or a gallery). The creation of a particular collection may be initiated by a particular user (e.g., each user for which a record is maintained in the entity table 708). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 714 stores video data that, in some examples, is associated with messages for which records are maintained within the message table 706. Similarly, the image table 716 stores image data associated with messages for which message data is stored in the entity table 708. The entity table 708 may associate various augmentations from the augmentation table 712 with various images and videos stored in the image table 716 and the video table 714.

Data Communications Architecture

Figure 8:
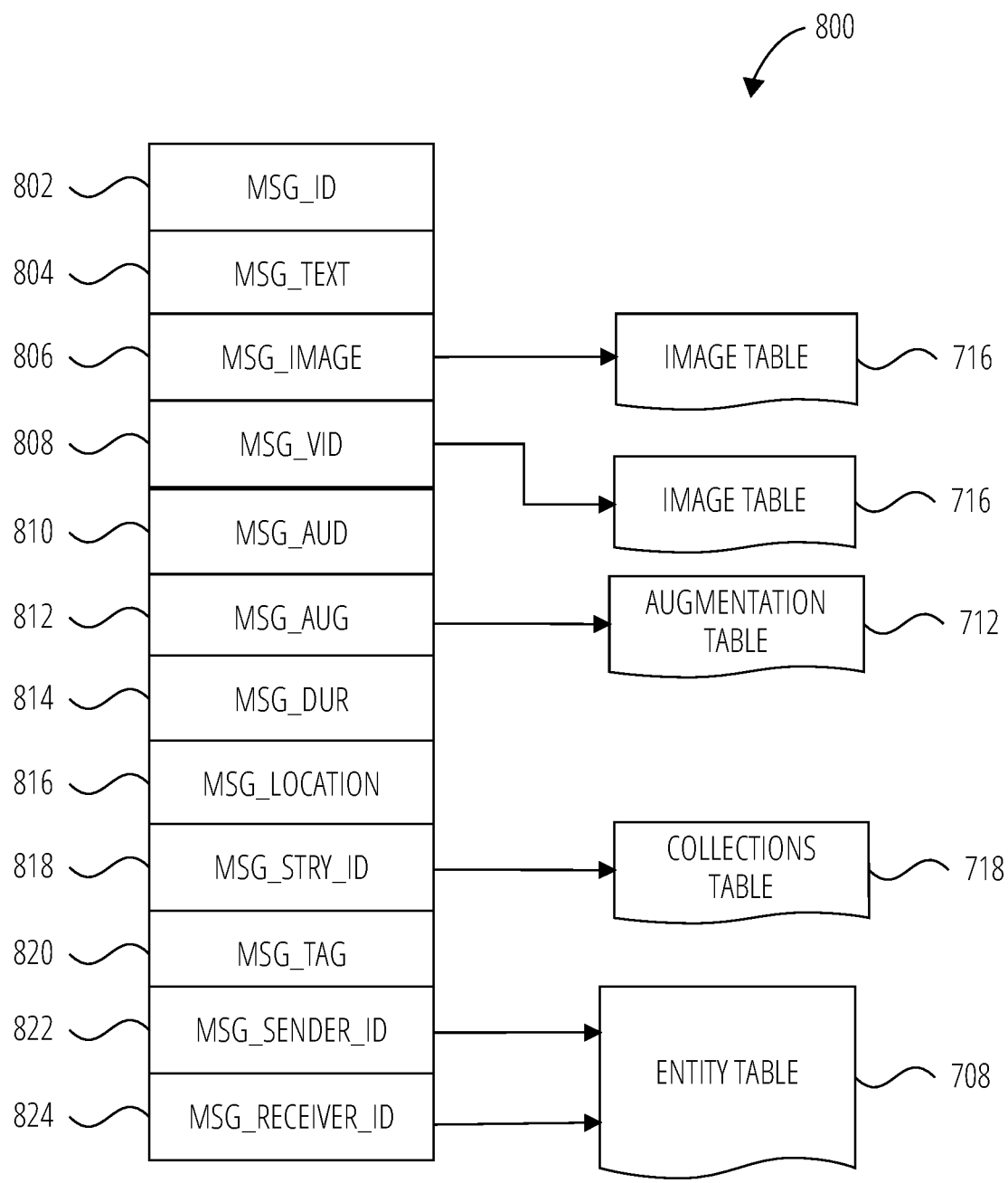
FIG. 8 is a diagrammatic representation of a message, according to some examples.

FIG. 8 is a schematic diagram illustrating a structure of a message 800, according to some examples, generated by an interaction client 104 for communication to a further interaction client 104 via the interaction servers 124. The content of a particular message 800 is used to populate the message table 706 stored within the database 704, accessible by the interaction servers 124. Similarly, the content of a message 800 is stored in memory as "in-transit" or "in-flight" data of the user system 102 or the interaction servers 124. A message 800 is shown to include the following example components:

- Message identifier 802: a unique identifier that identifies the message 800.
- Message text payload 804: text, to be generated by a user via a user interface of the user system 102, and that is included in the message 800.
- Message image payload 806: image data, captured by a camera component of a user system 102 or retrieved from a memory component of a user system 102, and that is included in the message 800. Image data for a sent or received message 800 may be stored in the image table 716.
- Message video payload 808: video data, captured by a camera component or retrieved from a memory component of the user system 102, and that is included in the message 800. Video data for a sent or received message 800 may be stored in the image table 716.
- Message audio payload 810: audio data, captured by a microphone or retrieved from a memory component of the user system 102, and that is included in the message 800.
- Message augmentation data 812: augmentation data (e.g., filters, stickers, or other annotations or enhancements) that represents augmentations to be applied to message image payload 806, message video payload 808, or message audio payload 810 of the message 800. Augmentation data for a sent or received message 800 may be stored in the augmentation table 712.
- Message duration parameter 814: parameter value indicating, in seconds, the amount of time for which content of the message (e.g., the message image payload 806, message video payload 808, message audio payload 810) is to be presented or made accessible to a user via the interaction client 104.
- Message geolocation parameter 816: geolocation data (e.g., latitudinal, and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).
- Message story identifier 818: identifier values identifying one or more content collections (e.g., "stories" identified in the collections table 718) with which a particular content item in the message image payload 806 of the message 800 is associated. For example, multiple images within the message image payload 806 may each be associated with multiple content collections using identifier values.
- Message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.
- Message sender identifier 822: an identifier (e.g., a messaging system identifier, email address, or device identifier) indicative of a user of the user system 102 on which the message 800 was generated and from which the message 800 was sent.
- Message receiver identifier 824: an identifier (e.g., a messaging system identifier, email address, or device identifier) indicative of a user of the user system 102 to which the message 800 is addressed.

The contents (e.g., values) of the various components of message 800 may be pointers to locations in tables within which content data values are stored. For example, an image value in the message image payload 806 may be a pointer to (or address of) a location within an image table 716. Similarly, values within the message video payload 808 may point to data stored within an image table 716, values stored within the message augmentation data 812 may point to data stored in an augmentation table 712, values stored within the message story identifier 818 may point to data stored in a collections table 718, and values stored within the message sender identifier 822 and the message receiver identifier 824 may point to user records stored within an entity table 708.

System with Head-Wearable Apparatus

Figure 9:
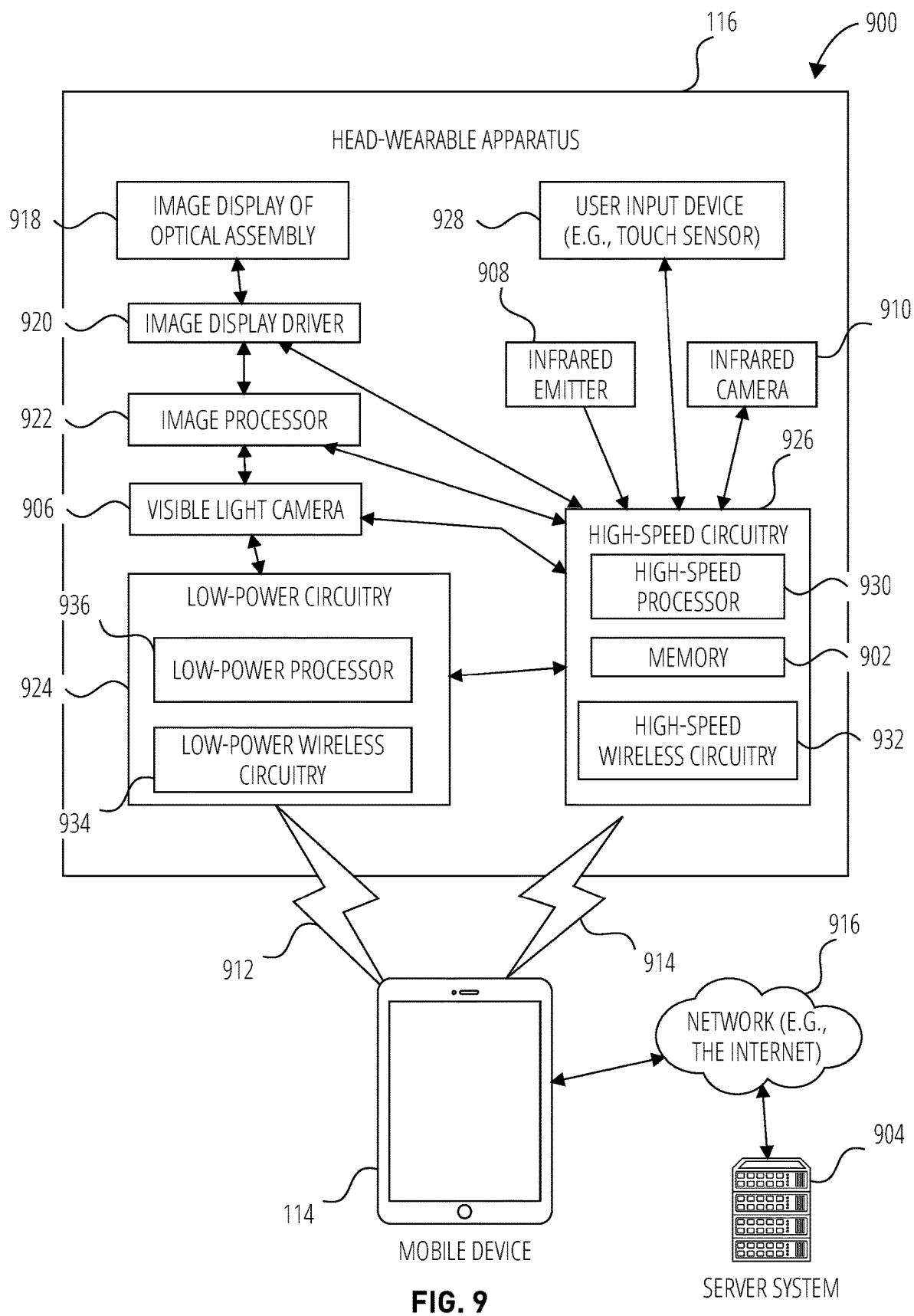
FIG. 9 illustrates a system in which the head-wearable apparatus, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the interaction server system 110) via various networks 108.

The head-wearable apparatus 116 includes one or more cameras, each of which may be, for example, a visible light camera 906, an infrared emitter 908, and an infrared camera 910.

The mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FIR. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
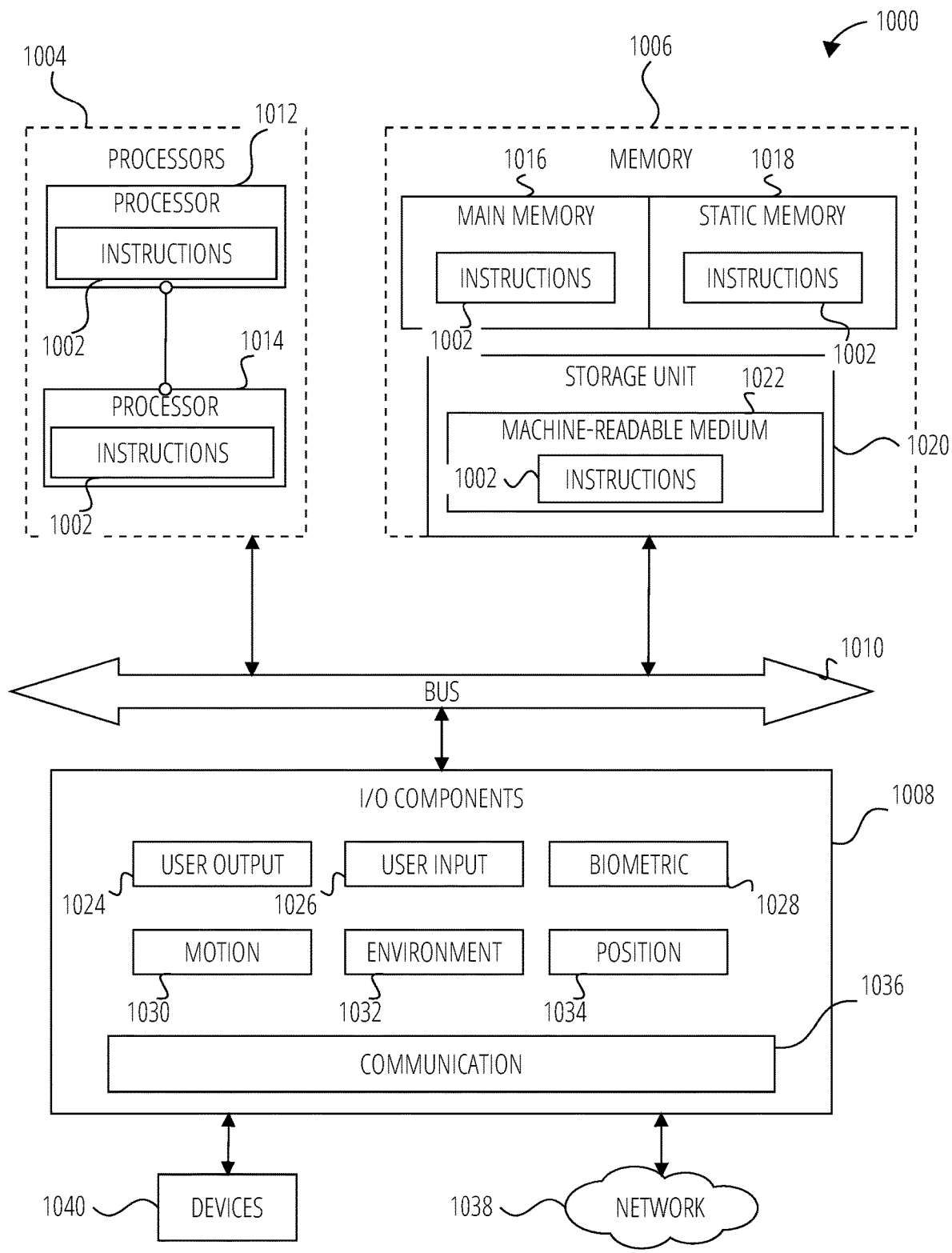
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
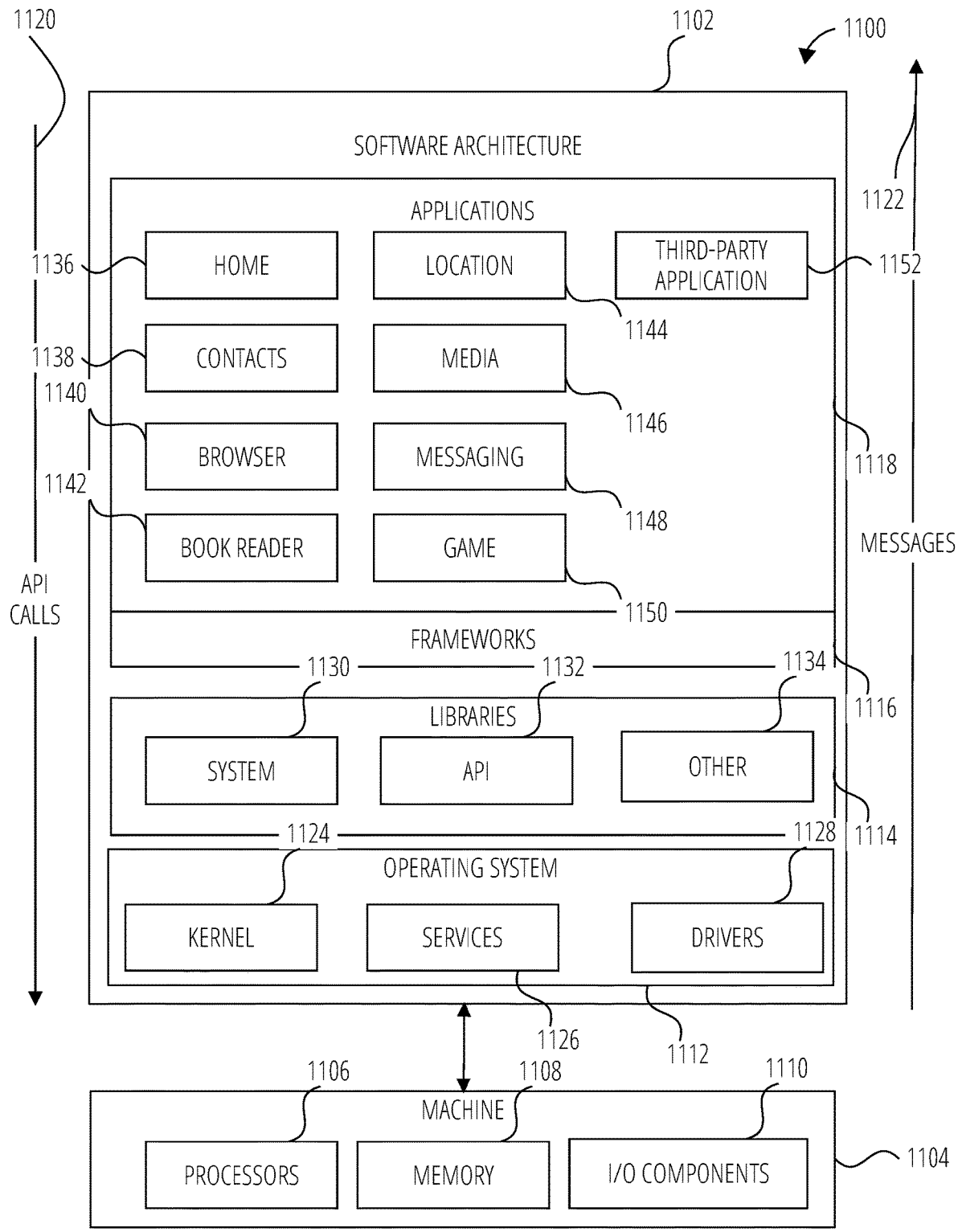
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

EXAMPLES

Example 1 is a system, comprising: at least one processor; and at least one memory component storing instructions that, when executed by the at least one processor, cause the at least one processor to perform operations comprising: detecting a start of a camera session; upon detecting start of the camera session, capturing initial raw data frames and storing the initial raw data frames in memory; determining that the camera session corresponds to a video recording session; upon determining that the camera session corresponds to a video recording session, activating a video recording pipeline; upon determining that the video recording pipeline is active: retrieving the initial raw data frames; encoding the initial raw data frames using the video recording pipeline; accessing, at the video recording pipeline, additional captured raw data frames; and encoding the additional captured raw data frames using the video recording pipeline; and upon detecting an end of the camera session, deactivating the video recording pipeline.

In Example 2, the subject matter of Example 1 includes, wherein detecting the start of the camera session comprises detecting, at a first time, that a camera trigger is enabled; and determining that the camera session corresponds to a video recording session comprises detecting that the camera trigger is still enabled at a second time corresponding to a predetermined time period.

In Example 3, the subject matter of Examples 1-2 includes, wherein storing the initial raw data frames in memory comprises buffering the initial raw data frames in a memory of a camera service module and assigning sequential reference numbers to the initial raw data frames.

In Example 4, the subject matter of Examples 1-3 includes, wherein storing the initial raw data frames in memory comprises: copying the initial raw data frames from a camera service module; and storing the copied initial raw data frames in memory of a video recording pipeline.

In Example 5, the subject matter of Examples 1-4 includes, wherein activating the video recording pipeline comprises initiating preparations for video recording.

In Example 6, the subject matter of Examples 1-5 includes, the operations further comprising: after encoding the initial raw data frames, sending encoded data frames to a component of the system for processing; processing the encoded data frames by the component; and deleting the initial raw data frames from memory.

In Example 7, the subject matter of Examples 1-6 includes, wherein: the initial raw data frames comprise video frames and audio frames; encoding the initial raw data frames using the video recording pipeline comprises: encoding the video frames and the audio frames; combining encoded video frames with corresponding encoded audio frames to generate a video file.

In Example 8, the subject matter of Example 7 includes, wherein combining encoded video frames with corresponding encoded audio frames is based on reference numbers assigned to video frames and corresponding reference numbers assigned to audio frames.

In Example 9, the subject matter of Examples 1-8 includes, determining a start of a second camera session; upon detecting start of the second camera session, capturing raw data frames, and storing raw data frames in memory; determining that the second camera session corresponds to a photo capture session; and upon determining that the second camera session corresponds to a photo capture session, capturing and storing a current raw data frame.

Example 10 is at least one machine-readable medium including instructions that, when executed by processing circuitry, cause the processing circuitry to perform operations to implement of any of Examples 1-9.

Example 11 is an apparatus comprising means to implement any of Examples 1-9.

Example 12 is a method to implement any of Examples 1-9.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled, or owned by a user and with which the user interacts perform an action or interaction on the user device, including an interaction with other users or computer systems.

What is claimed is:

1. A system, comprising:
   at least one processor; and
   at least one memory component storing instructions that, when executed by the at least one processor, cause the at least one processor to perform operations comprising:
   detecting a start of a camera session;
   upon detecting start of the camera session, capturing initial raw data frames and storing the initial raw data frames in memory;
   determining that the camera session corresponds to a video recording session;
   upon determining that the camera session corresponds to a video recording session, activating a video recording pipeline;
   upon determining that the video recording pipeline is active:
     retrieving the initial raw data frames;
     encoding the initial raw data frames using the video recording pipeline;
     accessing, at the video recording pipeline, additional captured raw data frames; and
     encoding the additional captured raw data frames using the video recording pipeline; and
   upon detecting an end of the camera session, deactivating the video recording pipeline.

2. The system of claim 1, wherein:
   detecting the start of the camera session comprises detecting, at a first time, that a camera trigger is enabled; and
   determining that the camera session corresponds to a video recording session comprises detecting that the camera trigger is still enabled at a second time corresponding to a predetermined time period.

3. The system of claim 1, wherein storing the initial raw data frames in memory comprises buffering the initial raw data frames in a memory of a camera service module and assigning sequential reference numbers to the initial raw data frames.

4. The system of claim 1, wherein storing the initial raw data frames in memory comprises:
   copying the initial raw data frames from a camera service module; and
   storing the copied initial raw data frames in memory of a video recording pipeline.

5. The system of claim 1, wherein activating the video recording pipeline comprises initiating preparations for video recording.

6. The system of claim 1, the operations further comprising:
   after encoding the initial raw data frames, sending encoded data frames to a component of the system for processing;
   processing the encoded data frames by the component; and
   deleting the initial raw data frames from memory.

7. The system of claim 1, wherein:
   the initial raw data frames comprise video frames and audio frames; and
   encoding the initial raw data frames using the video recording pipeline comprises:
     encoding the video frames and the audio frames; and
     combining encoded video frames with corresponding encoded audio frames to generate a video file.

8. The system of claim 7, wherein combining encoded video frames with corresponding encoded audio frames is based on reference numbers assigned to video frames and corresponding reference numbers assigned to audio frames.

9. The system of claim 1, further comprising:
   determining a start of a second camera session;
   upon detecting start of the second camera session, capturing raw data frames and storing raw data frames in memory;
   determining that the second camera session corresponds to a photo capture session; and
   upon determining that the second camera session corresponds to a photo capture session, capturing and storing a current raw data frame.

10. A method, using at least one processor, comprising:
    detecting a start of a camera session;
    upon detecting start of the camera session, capturing initial raw data frames and storing the initial raw data frames in memory;

determining that the camera session corresponds to a video recording session;

upon determining that the camera session corresponds to a video recording session, activating a video recording pipeline;

upon determining that the video recording pipeline is active:
  retrieving the initial raw data frames;
  encoding the initial raw data frames using the video recording pipeline;
  accessing, at the video recording pipeline, additional captured raw data frames; and
  encoding the additional captured raw data frames using the video recording pipeline; and upon detecting an end of the camera session, deactivating the video recording pipeline.

11. The method of claim 10, wherein:
detecting the start of the camera session comprises detecting, at a first time, that a camera trigger is enabled; and
determining that the camera session corresponds to a video recording session comprises detecting that the camera trigger is still enabled at a second time corresponding to a predetermined time period.

12. The method of claim 10, wherein storing the initial raw data frames in memory comprises buffering the initial raw data frames in a memory of a camera service module and assigning sequential reference numbers to the initial raw data frames.

13. The method of claim 10, wherein storing the initial raw data frames in memory comprises:
copying the initial raw data frames from a camera service module; and
storing the copied initial raw data frames in memory of a video recording pipeline.

14. The method of claim 10, wherein activating the video recording pipeline comprises initiating preparations for video recording.

15. The method of claim 10, further comprising:
after encoding the initial raw data frames, sending encoded data frames to a downstream component for processing;
processing the encoded data frames by the downstream component; and
deleting the initial raw data frames from memory.

16. The method of claim 10, wherein:
the initial raw data frames comprise video frames and audio frames; and
encoding the initial raw data frames using the video recording pipeline comprises:
  encoding the video frames and the audio frames; and
  combining encoded video frames with corresponding encoded audio frames to generate a video file.

17. The method of claim 16, wherein combining encoded video frames with corresponding encoded audio frames is based on reference numbers assigned to video frames and corresponding reference numbers assigned to audio frames.

18. The method of claim 10, further comprising:
determining a start of a second camera session;
upon detecting start of the second camera session, capturing raw data frames and storing raw data frames in memory;
determining that the second camera session corresponds to a photo capture session; and
upon determining that the second camera session corresponds to a photo capture session, capturing and storing a current raw data frame.

19. A non-transitory computer-readable storage medium, the computer-readable storage medium including instructions that when executed by a computer, cause the computer to:
detect a start of a camera session;
upon detecting start of the camera session, capturing initial raw data frames and storing the initial raw data frames in memory;
determining that the camera session corresponds to a video recording session;
upon determining that the camera session corresponds to a video recording session, activating a video recording pipeline;
upon determining that the video recording pipeline is active:
  retrieving the initial raw data frames;
  encoding the initial raw data frames using the video recording pipeline;
  accessing, at the video recording pipeline, additional captured raw data frames; and
  encoding the additional captured raw data frames using the video recording pipeline; and
upon detecting an end of the camera session, deactivating the video recording pipeline.

20. The non-transitory computer-readable storage medium of claim 19, wherein:
detecting the start of the camera session comprises detecting, at a first time, that a camera trigger is enabled; and
determining that the camera session corresponds to a video recording session comprises detecting that the camera trigger is still enabled at a second time corresponding to a predetermined time period.

* * * * *